United States Patent
Okada

(10) Patent No.: US 8,339,236 B2
(45) Date of Patent: Dec. 25, 2012

(54) ELECTRIC CONNECTION BOX

(75) Inventor: Eiji Okada, Hiroshima (JP)

(73) Assignee: Yazaki Corporation, Tokyo (JP)

( * ) Notice: Subject to any disclaimer, the term of this patent is extended or adjusted under 35 U.S.C. 154(b) by 3 days.

(21) Appl. No.: 12/863,797

(22) PCT Filed: Jan. 21, 2009

(86) PCT No.: PCT/JP2009/050885
§ 371 (c)(1),
(2), (4) Date: Jul. 21, 2010

(87) PCT Pub. No.: WO2009/093613
PCT Pub. Date: Jul. 30, 2009

(65) Prior Publication Data
US 2010/0289611 A1  Nov. 18, 2010

(30) Foreign Application Priority Data

Jan. 23, 2008 (JP) .................................. 2008-013063

(51) Int. Cl.
H01H 85/02 (2006.01)
H01H 85/20 (2006.01)
H01R 13/68 (2011.01)

(52) U.S. Cl. ... 337/198; 337/186; 337/230; 439/620.33; 439/620.26; 29/623

(58) Field of Classification Search .................. 337/187, 337/230, 198, 186; 439/620.33, 620.26; 29/623
See application file for complete search history.

(56) References Cited

U.S. PATENT DOCUMENTS

| 4,670,729 A | * | 6/1987 | Oh ................................. 337/262 |
| 5,171,293 A | * | 12/1992 | Umemoto et al. ........ 439/620.33 |
| 5,215,479 A | * | 6/1993 | Araki et al. ............... 439/620.33 |
| 5,277,626 A | * | 1/1994 | Oikawa et al. ........... 439/620.27 |
| 5,285,011 A | * | 2/1994 | Shimochi .......................... 174/59 |
| 5,632,654 A | * | 5/1997 | Sugiura .................... 439/620.26 |
| 5,662,496 A | * | 9/1997 | Kanamori ............... 439/620.27 |

(Continued)

FOREIGN PATENT DOCUMENTS
JP  1150250 U  10/1989
(Continued)

OTHER PUBLICATIONS

International Search Report (PCT/ISA/210) issued Feb. 24, 2009 in PCT/JP2009/050885.

(Continued)

*Primary Examiner* — Bradley Thomas
(74) *Attorney, Agent, or Firm* — Sughrue Mion, PLLC

(57) ABSTRACT

There is provided an electric connection box in which even when a housing of a fuse is fusedly damaged by heat radiation or melting of a fusible element of the fuse, the fusedly-damaged housing can be restrained from adhering to an inner bottom portion of a fuse cavity. The inner bottom portion (11*a*) of the fuse cavity has a projecting portion (16) formed on an inner bottom face thereof and extending upwardly from the inner bottom face, and an upper face (16*c*, 16*d*) of the projecting portion (16) abuts against a lower face (21*b*) of the housing (21) of the fuse (2), and a gap (15*e*) is formed between the inner bottom face and the lower face (21*b*) of the housing (21) because of the projecting portion (16).

10 Claims, 14 Drawing Sheets

U.S. PATENT DOCUMENTS

| | | | |
|---|---|---|---|
| 5,680,088 A * | 10/1997 | Seki et al. | 337/194 |
| 5,748,068 A * | 5/1998 | Kiyota | 337/208 |
| 5,886,612 A * | 3/1999 | Beckert et al. | 337/197 |
| 6,089,918 A * | 7/2000 | Arakelian et al. | 439/620.27 |
| 6,556,120 B2 * | 4/2003 | Endo et al. | 337/198 |
| 6,753,753 B2 * | 6/2004 | Endo et al. | 337/198 |
| 6,781,503 B1 * | 8/2004 | Kubota | 337/230 |
| 6,784,365 B2 * | 8/2004 | Ohashi et al. | 174/50 |
| 6,875,028 B2 * | 4/2005 | Kita et al. | 439/76.2 |
| 6,922,332 B2 * | 7/2005 | Naimi et al. | 361/641 |
| 7,077,667 B2 * | 7/2006 | Maebashi | 439/76.2 |
| 7,094,105 B2 * | 8/2006 | Kobayashi | 439/620.29 |
| 7,118,390 B2 * | 10/2006 | Kita | 439/76.2 |
| 7,172,437 B2 * | 2/2007 | Maebashi | 439/76.2 |
| 7,479,867 B2 * | 1/2009 | Kita | 337/230 |
| 2002/0044038 A1 * | 4/2002 | Andoh et al. | 337/260 |
| 2003/0156005 A1 * | 8/2003 | Ohashi et al. | 337/160 |
| 2003/0221852 A1 * | 12/2003 | Ohashi et al. | 174/48 |
| 2005/0272314 A1 * | 12/2005 | Kobayashi | 439/621 |
| 2006/0119463 A1 * | 6/2006 | Kubota | 337/182 |
| 2006/0199404 A1 * | 9/2006 | Kubota | 439/76.2 |
| 2006/0216968 A1 * | 9/2006 | Maebashi | 439/76.2 |
| 2007/0015382 A1 * | 1/2007 | Asao | 439/76.1 |
| 2007/0293091 A1 * | 12/2007 | Korczynski | 439/620.26 |
| 2008/0061920 A1 * | 3/2008 | Kubota | 337/198 |

FOREIGN PATENT DOCUMENTS

| | | |
|---|---|---|
| JP | 9322358 A | 12/1997 |
| JP | 2001-351502 A | 12/2001 |
| JP | 2004-064871 A | 2/2004 |
| JP | 2005-209509 A | 8/2005 |

OTHER PUBLICATIONS

International Preliminary Examination Report (PCT/ISA/237) issued Feb. 24, 2009 in PCT/JP2009/050885.

Japanese Office Action dated Sep. 25, 2012 issued by the Japanese Patent Office in corresponding Japanese Patent Application No. 2008-013063.

* cited by examiner

ELECTRIC CONNECTION BOX

TECHNICAL FIELD

The present invention is related to an electric connection box having fuse cavities for accommodating fuses.

BACKGROUND ART

As a conventional electric connection box having fuse cavities, an electric connection box disclosed in PLT 1 is cited. FIG. 14 is a perspective view showing a main portion of the conventional electric connection box in a fuse non-attached condition. FIG. 15 is a perspective showing a condition in which a fuse is attached to the electric connection box of FIG. 14.

The conventional electric connection box 5 shown in FIG. 14 has a fuse cavity 51 into which the fuse 6 can be inserted from the upper side. A pair of cavity terminals 52 project from an inner bottom face of the fuse cavity 51. When the fuse 6 shown in FIG. 15 is inserted into the fuse cavity 51, a pair of fuse terminals (not shown in FIG. 14 and FIG. 15) accommodated in a housing 61 of the fuse 6 come into contact with the pair of cavity terminals 52 and are electrically connected thereto.

Citation List
  Patent Literature
   [PLT 1] JP-A-2004-64871

SUMMARY OF INVENTION

Technical Problem

However, in the conventional electric connection box 5, in a case where the housing 61 is fusedly damaged by heat radiation of a fusible element (not shown in FIG. 14 and FIG. 15) of the fuse 6 or by deposition of the melted fusible element, a lower face of the housing 61 adheres to the inner bottom face of the fuse cavity 51. The lower face is a portion of the housing 61 disposed forwardly in a direction of insertion into the fuse cavity 51. As a result, it is difficult to withdraw the fuse 6, having the fusedly-damaged housing 61, from the electric connection box 5.

The above-mentioned matter is more liable to occur particularly in the case where the fuse 6 is a slow blow fuse, which is an anti-rush current-type fuse, than in the case where it is a quick blow-type fuse. The reason for this is that the blowing time of the slow blow fuse lasts long, so that the housing 61 forming the slow blow fuse is more fusedly damaged.

The present invention has been made in view of the above circumstances, and its object is to provide an electric connection box in which even when a housing of a fuse is fusedly damaged by heat radiation or melting of a fusible element of the fuse, the fusedly-damaged housing can be restrained from adhering to an inner bottom portion of a fuse cavity.

Solution to Problem (1) In order to achieve the above-mentioned object, an electric connection box of the present invention comprises:
  a fuse cavity, made of synthetic resin, into which a fuse can be inserted from an upper side, the fuse including a pair of fuse terminals, a fusible element electrically connecting the fuse terminals, and a housing made of synthetic resin and accommodating the fuse terminals so as to cover the fusible element; and
  a pair of cavity terminals configured to come in contact with the fuse terminals to be electrically connected thereto when the fuse is inserted into the fuse cavity,
  wherein a lower face of the housing of the fuse inserted in the fuse cavity is configured to abut against an inner bottom portion of the fuse cavity, so that the fuse is positioned in the fuse cavity in a downward direction;
  wherein the inner bottom portion has a projecting portion formed on an inner bottom face of the inner bottom portion and extending upwardly from the inner bottom face;
  wherein an upper face of the projecting portion abuts against the lower face of the housing; and
  wherein a gap is formed between the inner bottom face and the lower face of the housing by the projecting portion.

In the electric connection box of the present invention, described as (1), the upper face of the projecting portion, formed on the inner bottom face of the fuse cavity and extending upwardly from the inner bottom face, abuts against the lower face of the housing of the fuse, and the gap is formed between the inner bottom face of the fuse cavity and the lower face of the housing of the fuse because of the projecting portion. Therefore, even when that portion of the housing of the fuse disposed forwardly in the direction of insertion into the fuse cavity which is a wall portion forming the lower face of the housing of the fuse is fusedly damaged by heat radiation of the fusible element or the deposition of the melted fusible element, the area of that portion of the fuse cavity adhering to the fusedly-damaged portion of the housing can be kept to a small level. Therefore, the fuse whose housing is fusedly-damaged can be easily taken out from the fuse cavity.

(2) Furthermore, it is preferred that the projecting portion is provided at the inner bottom face between the cavity terminals when the fuse cavity is viewed from the upper side, and the projecting portion is located right beneath the fusible element of the fuse accommodated in the fuse cavity.

With the construction described as (2), when the fuse is accommodated in the electric connection box, the housing of the fuse is supported in a well-balanced manner in a stable condition thanks to the cooperation of the upper face of the projecting portion and an inner peripheral face of the fuse cavity with each other, and therefore this is preferable.

(3) Furthermore, it is preferred that the projecting portion is projected on the inner bottom face so that the gap is formed between a lower face of a portion of the housing of the fuse located right beneath the fusible element and the inner bottom face of the fuse cavity, in a state where the fuse is accommodated in the fuse cavity.

With the construction described as (3), the projecting portion is provided avoiding the region right beneath the fusible element of the fuse, and namely when by heat radiation of the fusible element or the deposition of the melted fusible element, the housing of the fuse is fusedly damaged starting from the portion thereof near to the fusible element which portion is liable to be fusedly damaged, the upper face of the projecting portion abuts against that portion which is, the portion harder to fusedly damage of the lower face of the housing of the fuse disposed farther away from the fusible element, and therefore the fusedly-damaged housing can even be prevented from adhering to the upper face of the projecting portion, and therefore this is preferable. As a result of thus restraining the fusedly-damaged housing from adhering to the inner bottom portion of the fuse cavity, the fuse whose housing is fusedly damaged can be easily taken out from the electric connection box.

(4) It is preferred that the fuse of the electric connection box as described above is a slow blow fuse.

With the construction described as (4), when the slow blow fuse whose housing tends to be more fusedly damaged is accommodated, the fusedly-damaged housing can be more markedly restrained from adhering to the inner bottom portion of the fuse cavity, and therefore this is preferable.

Advantageous Effects of Invention

In the electric connection box of the present invention, even when the housing of the fuse is fusedly damaged by heat radiation or melting of the fusible element of the fuse, the fusedly-damaged housing can be restrained from adhering to the inner bottom portion of the fuse cavity, and therefore the fuse whose housing is fusedly damaged can be easily taken out from the electric connection box. Therefore, in the present invention, a workload for fuse exchange can be reduced.

DESCRIPTION OF EMBODIMENTS

Preferred embodiments of the present invention will be described below in detail with reference to the drawings.

Figure 1:
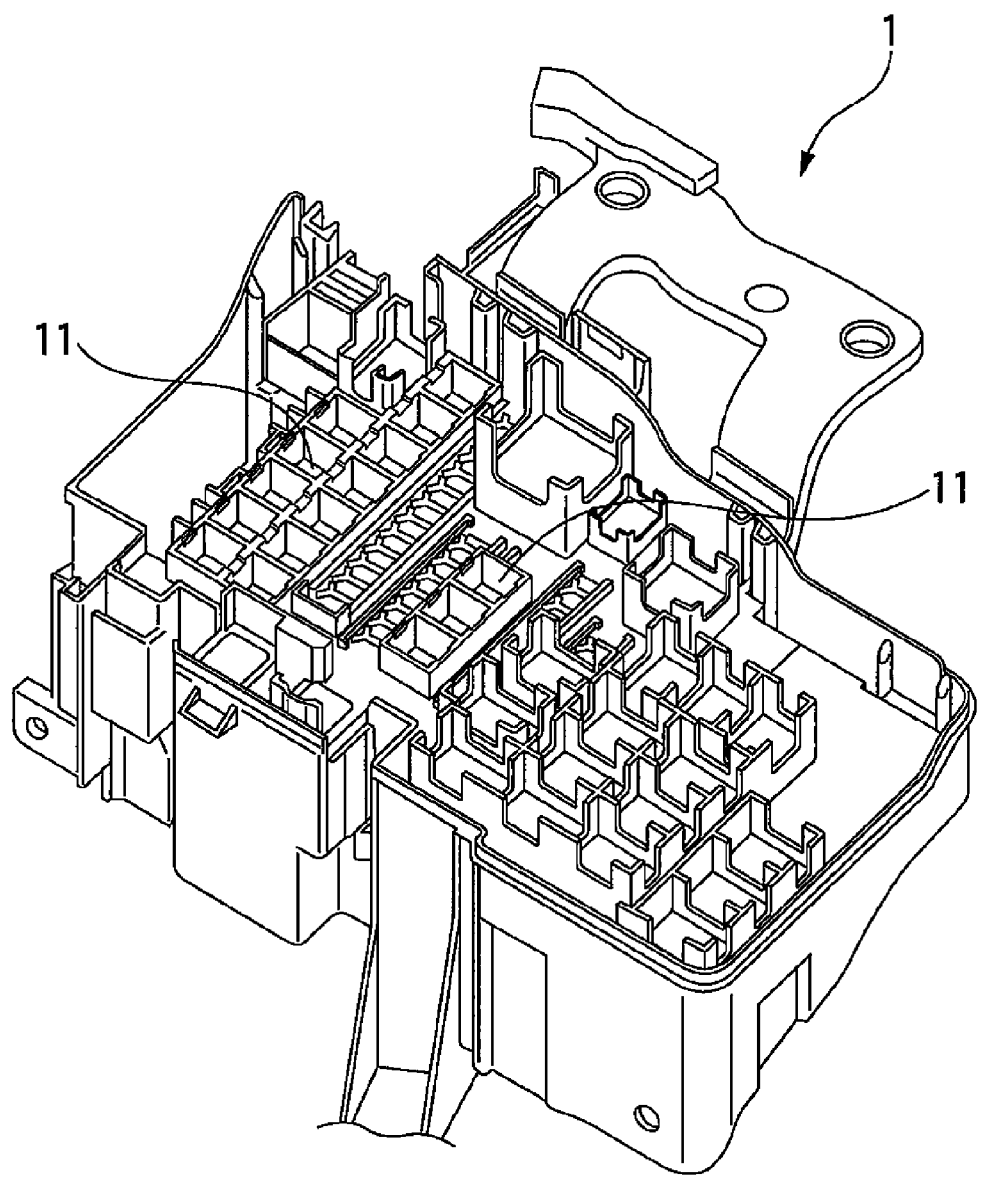
FIG. 1 is a perspective view of one embodiment of an electric connection box of the present invention.

As shown in FIG. 1, one embodiment of an electric connection box 1 of the present invention has fuse cavities 11 formed in a plurality of portions of a face of a synthetic resin-made box body of the electric connection box 1, into which fuse cavities fuses can be inserted from the upper side, and has various electrical parts, various electric circuits and wiring, connecting these electrical parts, these electric circuits and the fuses, accommodated within the box body of the electric connection box 1. The electrical parts, the electric circuits and the wiring are not shown in FIG. 1.

Figure 2:
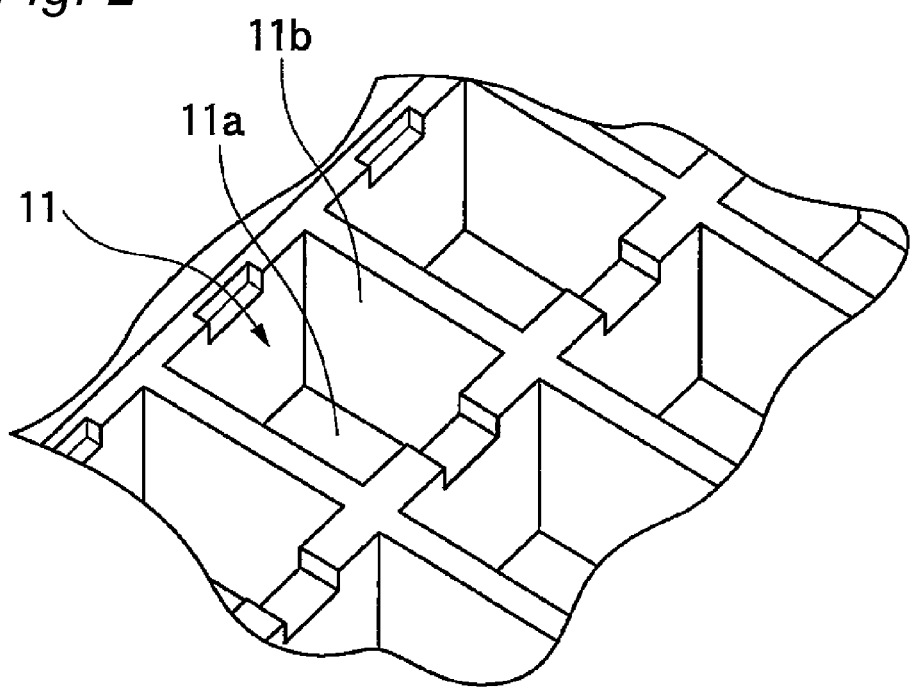
FIG. 2 is a perspective view showing an main portion of the one embodiment of the electric connection box of the present invention in a fuse non-attached condition.
Figure 3:
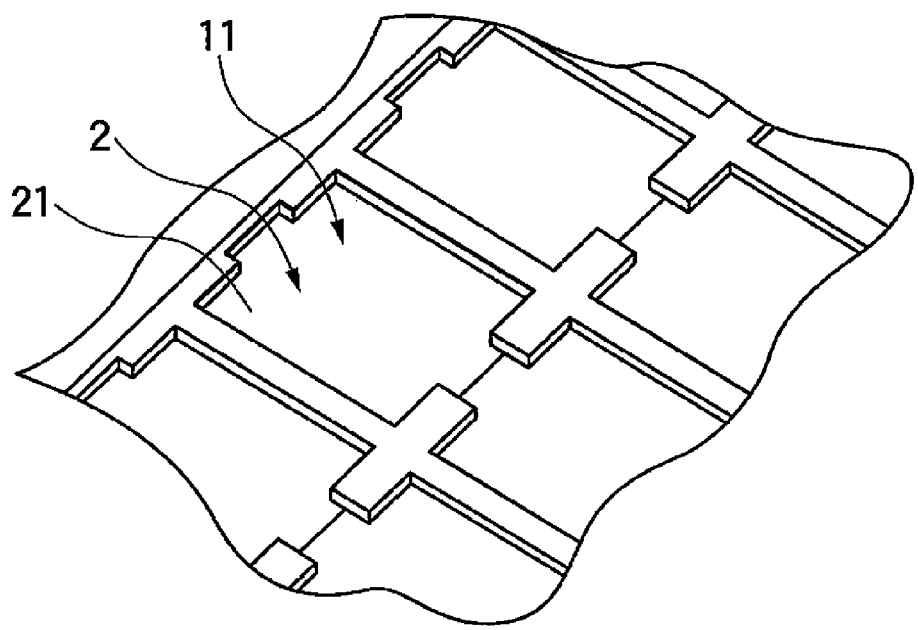
FIG. 3 is a perspective view showing a condition in which a fuse is attached to the electric connection box shown in FIG. 2.

As shown in FIG. 2 and FIG. 3, the fuse cavity 11 is so formed that part or all of the fuse 2 can be accommodated in a recess portion formed by an inner bottom portion 11a and inner peripheral faces 11b of the fuse cavity 11. A pair of cavity terminals 12 project from the inner bottom portion 11a of the fuse cavity 11 (see FIG. 6, etc.). At the time when the fuse 2 is inserted into the fuse cavity 11, the pair of cavity terminals 12 enter the inside of a housing 21 of the fuse 2, and come into contact respectively with a pair of fuse terminals 22 (see FIG. 4, etc.) accommodated within the housing 21 of the fuse 2, and are electrically connected respectively to the fuse terminals. With respect to the fuse 2 inserted in the fuse cavity 11, its positioning in a downward direction in the fuse cavity 11 is effected by the abutting of a lower face of the housing 21 of the fuse 2 against the inner bottom portion 11a of the fuse cavity. A specific construction with which the lower face of the housing 21 of the fuse 2 abuts against the inner bottom portion 11a of the fuse cavity 11 will be described later.

Figure 4:
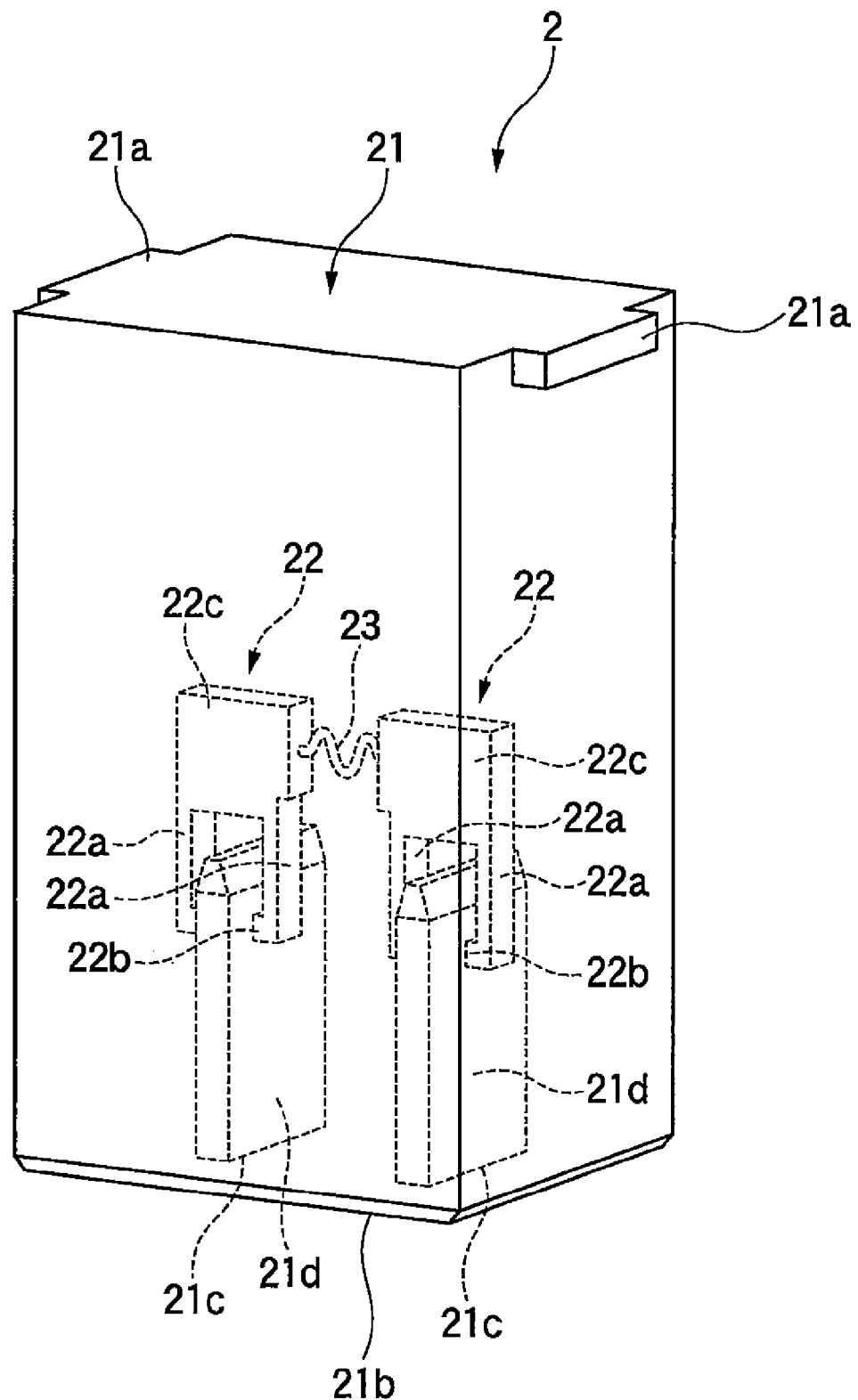
FIG. 4 is a perspective view of the fuse to be inserted into the one embodiment of the electric connection box of the present invention.

Next, the structure of the fuse 2 to be inserted into the one embodiment of the electric connection box of the present invention will be described in detail. As shown in FIG. 4, the fuse 2 is a slow blow fuse which is an anti-rush current-type fuse, and is constructed such that it comprises the pair of fuse terminals 22 made of a conductor, a fusible element 23 of an excellent anti-rush ability disposed between the pair of fuse terminals 22 and electrically connecting the pair of fuse terminals 22 together, and the synthetic resin-made housing 21 accommodating the fuse terminals 22 in a manner to cover the fusible element 23 and forming the outer shape of the fuse 2.

The housing 21 is made of a colored transparent insulative synthetic resin material or the like. Since the housing 21 is formed of the transparent material, whether the fusible element 23 accommodated within the housing 21 is melted or not can be visually confirmed from the upper face, side faces and lower face of the housing 21. Engagement portions 21a are formed respectively at side portions of the upper end of the housing 21, and when the fuse 2 is inserted into the fuse cavity 11, the engagement portions 21a are fitted respectively into engagement grooves 17 formed in the fuse cavity 11. With respect to the fuse 2 inserted in the fuse cavity 11, its positioning in the downward direction in the fuse cavity 11 is effected also by the fitting of the engagement portions 21a into the respective engagement grooves 17 of the fuse cavity 11. In order to guide the pair of cavity terminals 12 into the inside of the housing 21 at the time when the fuse 2 is inserted into the fuse cavity 11, open portions 21c are formed in the lower face 21b of the housing 21, and also insertion passages 21d which the pair of cavity terminals 12 enter, respectively, are formed in the inside of the housing.

Each of the fuse terminals 22 is a so-called tuning fork-like terminal which includes a pair of movable arm portions 22a capable of holding the cavity terminal 12, inserted in the insertion passage 21d, therebetween, a curved gripping portion 22b formed at a distal end of each movable arm portion 22a so as to positively contact the fuse terminal 22 with the cavity terminal 12, and a proximal end portion 22c from which the pair of movable arm portions 22a extend. The fuse terminal 22 is electrically connected to the cavity terminal 12 when the cavity terminal 12 inserted in the insertion passage 21d comes into contact with the gripping portions 22b of the fuse terminal 22. Incidentally, in the one embodiment of the present invention, although the fuse terminal 22 is the tuning fork-like terminal, it is not limited to the tuning fork-like terminal, and terminals of various shapes can be adopted (see, for example, FIG. 1, FIG. 9, of JP-A-8-185790).

The fusible element 23 is formed of a material such as zinc, lead, silver or an alloy comprising them as a main component, and one end thereof is connected to the proximal end portion 22c of one fuse terminal 22, and the other end thereof is connected to the proximal end portion 22c of the other fuse terminal 22.

Figure 5:
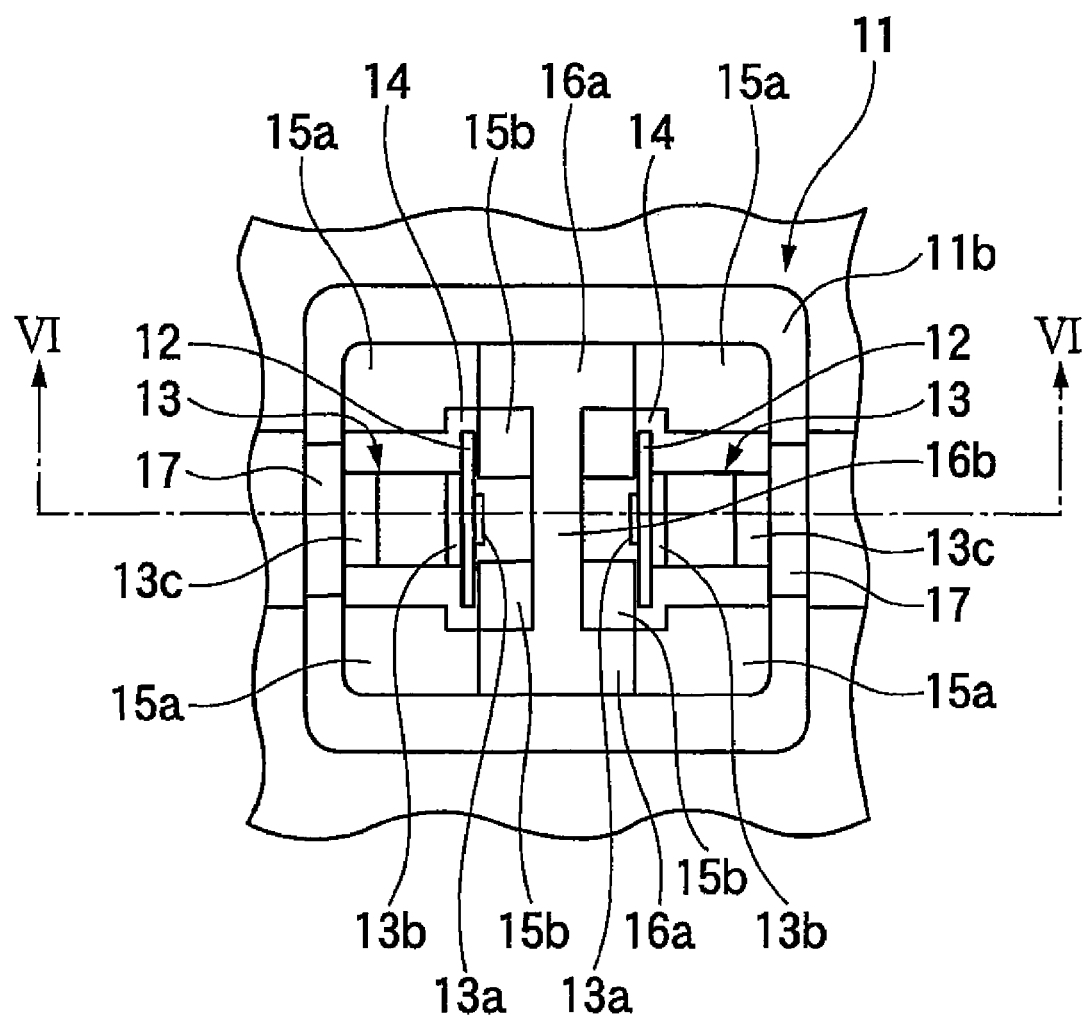
FIG. 5 is a view showing a fuse cavity of the one embodiment of the electric connection box of the present invention as seen from an upper side.
Figure 6:
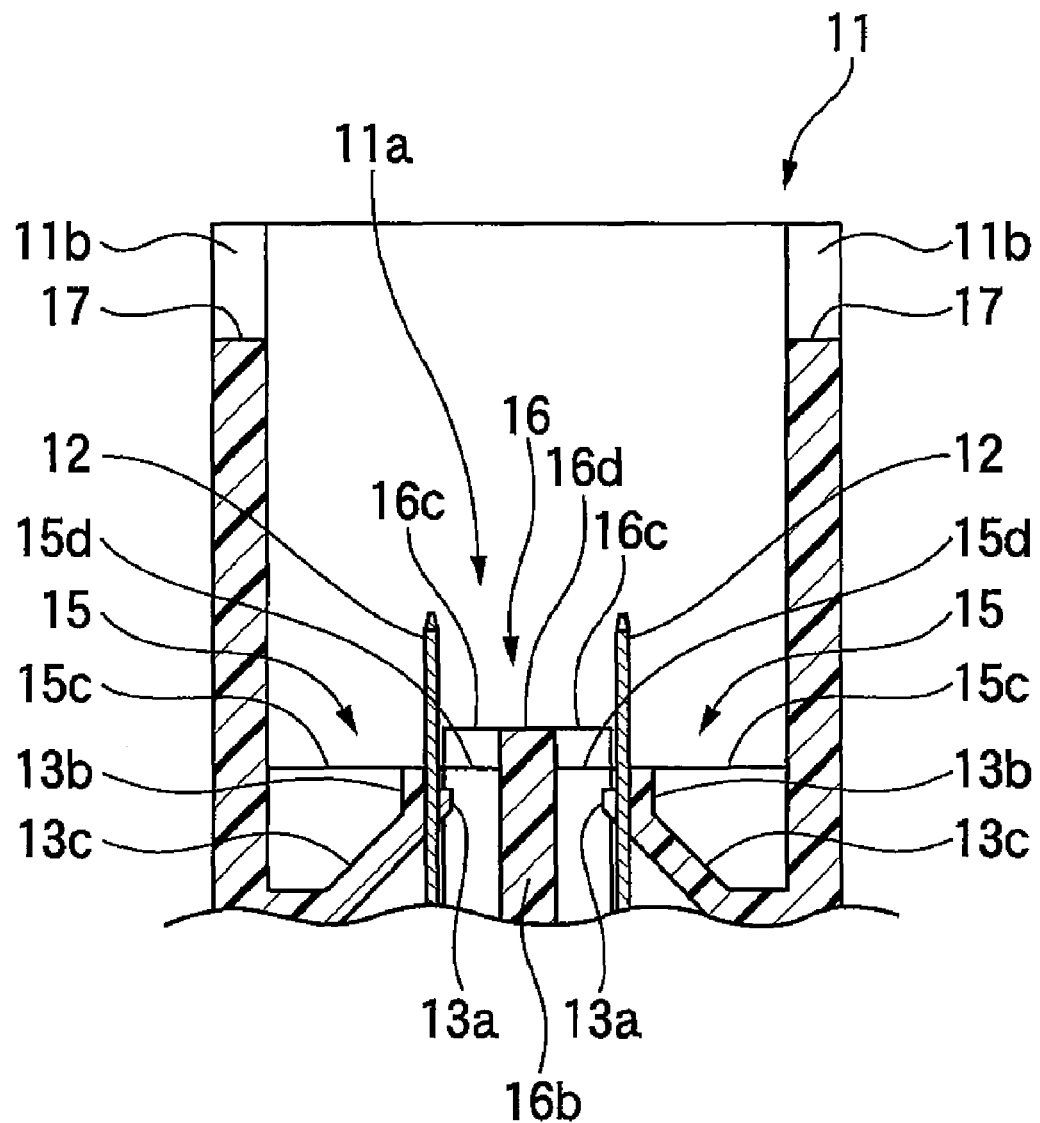
FIG. 6 is a cross-sectional view taken along the line VI-VI of FIG. 5.

Next, the structure of the fuse cavity 11 in the one embodiment of the electric connection box of the present invention will be described in detail. As shown in FIG. 5 and FIG. 6, the fuse cavity 11 is provided with the pair of cavity terminals 12 projecting from the inner bottom portion 11a of the fuse cavity 11, terminal support bodies 13 for fixing the respective cavity terminals 12, accommodating grooves 14 for respectively accommodating the lower ends of the cavity terminals 12 at a level below the inner bottom portion 11a, a non-projecting portion 15 forming part of the inner bottom portion 11a of the fuse cavity 11, a projecting portion 16 which forms part of the inner bottom portion 11a of the fuse cavity 11 and has an upper face disposed above the non-projecting portion 15, and the engagement grooves 17 for the fitting of the respective engagement portions 21a of the fuse 2 thereto when inserting the fuse 2 into the fuse cavity 11.

The cavity terminal 12 is a so-called male tab terminal, and at the time when the fuse 2 is inserted into the fuse cavity 11, the cavity terminal 12 passes through the open portion 21c of the housing 21, and enters the insertion passage 21d of the housing 21, and is accommodated in the insertion passage 21d. The cavity terminal 12 inserted in the insertion passage 21d contacts the gripping portions 22b of the fuse terminal 22, and therefore is electrically connected to the fuse terminal 22. Incidentally, in the one embodiment of the present invention, description is made of the construction in which the fuse terminal 22 of the fuse 2 is the so-called tuning fork-like terminal, and the cavity terminal 12 of the fuse cavity 11 enters a tuning fork-like portion of the fuse terminal 22; however, the constructions of the fuse terminal 22 and cavity terminal 12 may be reversed. Namely, there may be provided a construction in which the cavity terminal 12 is a so-called tuning fork-like terminal, while the fuse terminal 22 is a so-called male tab terminal.

The terminal support body 13 includes a support projection 13a for passing through a hole, formed in the cavity terminal 12, to fix this cavity terminal 12, a holder 13b for holding the cavity terminal 12 through which the support projection 13a passes, and a support bar 13c which has the support projection 13a and the holder 13b extending from one end thereof and is fixed at the other end thereof to a box body of the fuse cavity 11. At the time when the lower end of the cavity terminal 12 is accommodated in the accommodating groove 14, the support projection 13a is passed through the hole formed in the cavity terminal 12 until the cavity terminal 12 is brought into contact with the holder 13b, and by doing so, the cavity terminal 12 is fixed in such a manner that it projects from the inner bottom portion 11a of the fuse cavity 11.

The non-projecting portion 15 forms part of the inner bottom portion 11a of the fuse cavity 11, and is formed by four corner portions 15a, defined by the inner peripheral faces 11b of the fuse cavity 11, and central portions 15b surrounded by the accommodating grooves 14, pedestals 16a as described later and an elongated projection 16b as described later.

Figure 7:
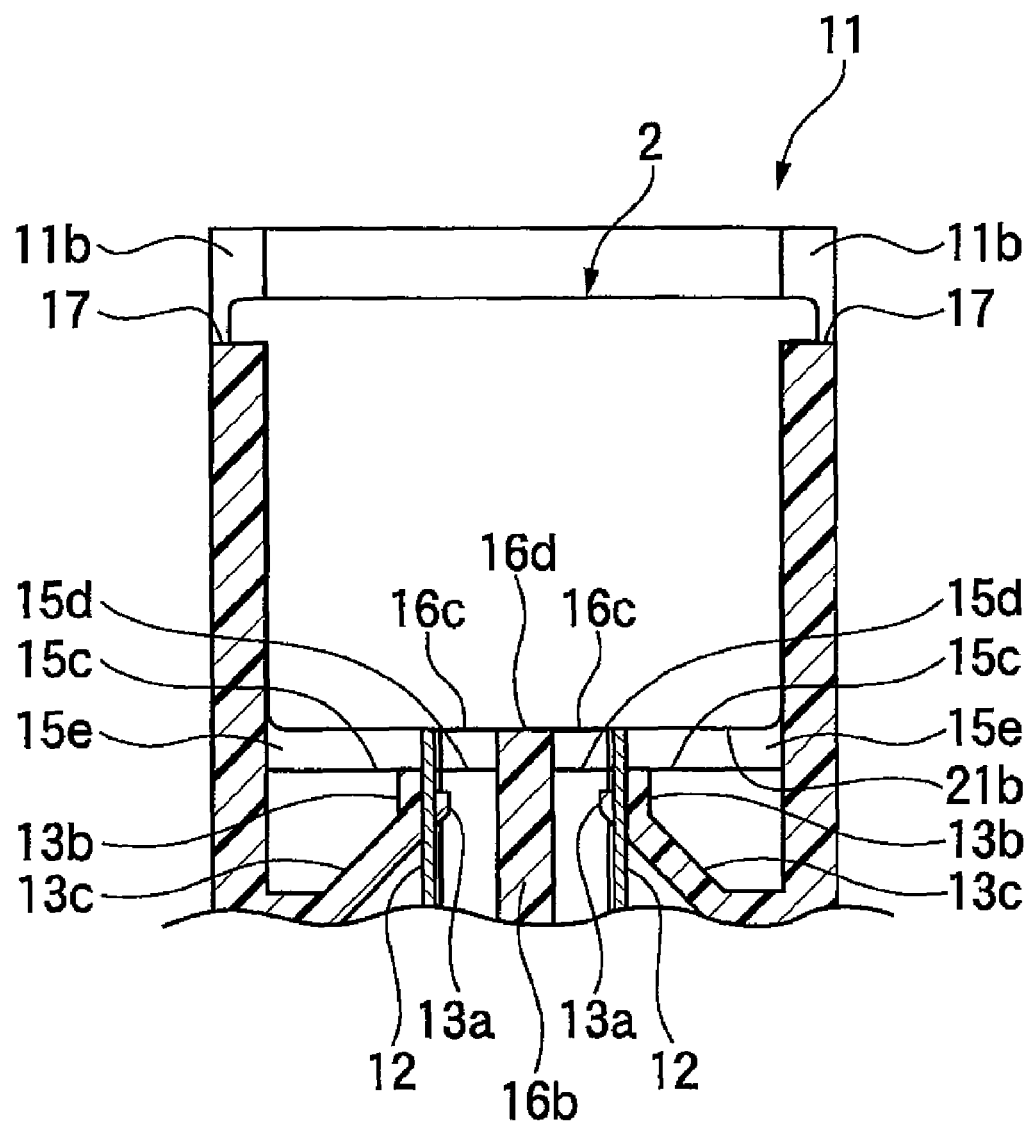
FIG. 7 is a cross-sectional view showing a condition in which the fuse is attached to the fuse cavity of FIG. 6.

The projecting portion 16 forms part of the inner bottom portion 11a of the fuse cavity 11, and is formed by the two pedestals 16a, disposed contiguous respectively to two of the four inner peripheral faces 11b of the fuse cavity 11 which are opposed to each other in a direction perpendicular to the direction of juxtaposition of the pair of cavity terminals 12, and the elongated projection 16b having longitudinally-spaced opposite ends integrally molded respectively with the two pedestals 16a. The elongated projection 16b is provided to be located between the pair of cavity terminals 12, and is particularly so provided as to be located right beneath the fusible element 23 of the fuse 2 when the fuse 2 is inserted into the fuse cavity 11. Upper faces 16c of the pedestals 16a and an upper face 16d of the elongated projection 16b are formed on a common plane, and the positions of these upper faces are disposed above upper faces 15c of the corner portions 15a and upper faces 15d of the central portions 15b which form the non-projecting portion 15. Therefore, when the fuse 2 is inserted into the fuse cavity 11 as shown in FIG. 7, the upper faces 16c of the pedestals 16a and the upper face 16d of the elongated projection 16b abut against the lower face 21b of the housing 21 of the fuse 2, while the upper faces 15c of the corner portions 15a and the upper faces 15d of the central portions 15b do not abut against the lower face 21b of the housing 21 of the fuse 2, and a gap 15e is formed between them and the lower face 21b of the housing 21 of the fuse 2. Therefore, the area of the lower face 21b of the housing 21 of the fuse 2 abutting against the inner bottom portion 11a of the fuse cavity 11 is limited to the areas of the faces defined by the upper faces 16c of the pedestals 16a and the upper face 16d of the elongated projection 16b.

Taking it into consideration that the upper faces 16c of the pedestals 16a and the upper face 16d of the elongated projection 16b abut against the lower face 21b of the housing 21 of the fuse when the fuse 2 is inserted into the fuse cavity 11, the engagement grooves 17 are provided respectively at those portions of the inner peripheral faces 11b spaced upwardly from the upper faces 16c of the pedestals 16a and the upper face 16d of the elongated projection by a length from the lower face 21b of the housing 21 of the fuse 2 to the engagement portions 21a. With this arrangement, even when the upper faces 16c of the pedestals 16a and the upper face 16d of the elongated projection 16b abut against the lower face 21b of the housing 21 of the fuse, the engagement portions 21a of the fuse 2 are fitted respectively into the engagement grooves 17 of the fuse cavity 11.

Next, in order to compare the area of the inner bottom portion 11a of the fuse cavity 11 (which has been described with reference to FIG. 5, FIG. 6 and FIG. 7) which abuts against the lower face 21b of the housing 21 of the fuse 2, the structure of a fuse cavity which is not provided with a projecting portion will be described as a reference example with reference to FIG. 8 to FIG. 10. Each portion of the fuse cavity 11 except an inner bottom portion 11a and each portion of a fuse 2 are as described with reference to FIG. 4 to FIG. 7, and explanation thereof will be omitted.

Figure 8:
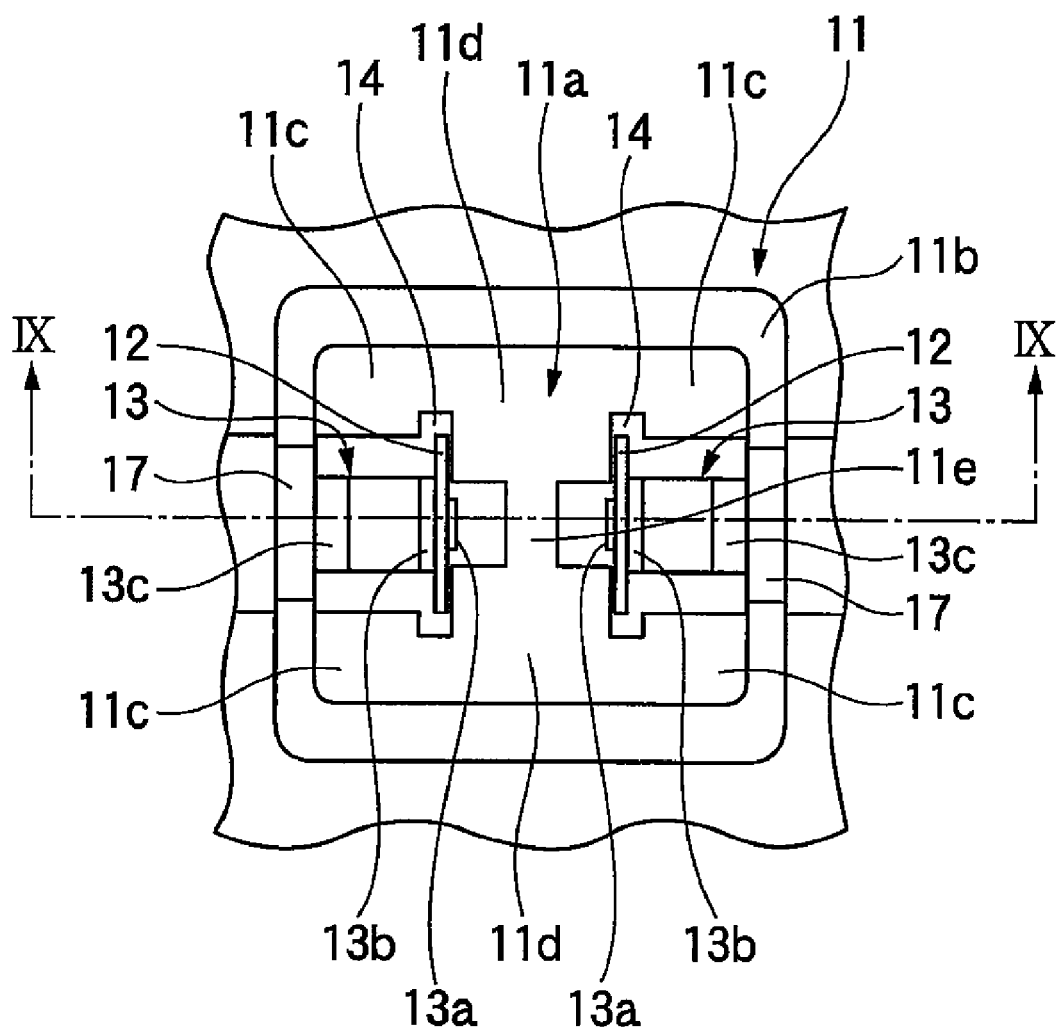
FIG. 8 is a view showing a fuse cavity of an electric connection box which is not provided with a projecting portion, as seen from an upper side.
Figure 9:
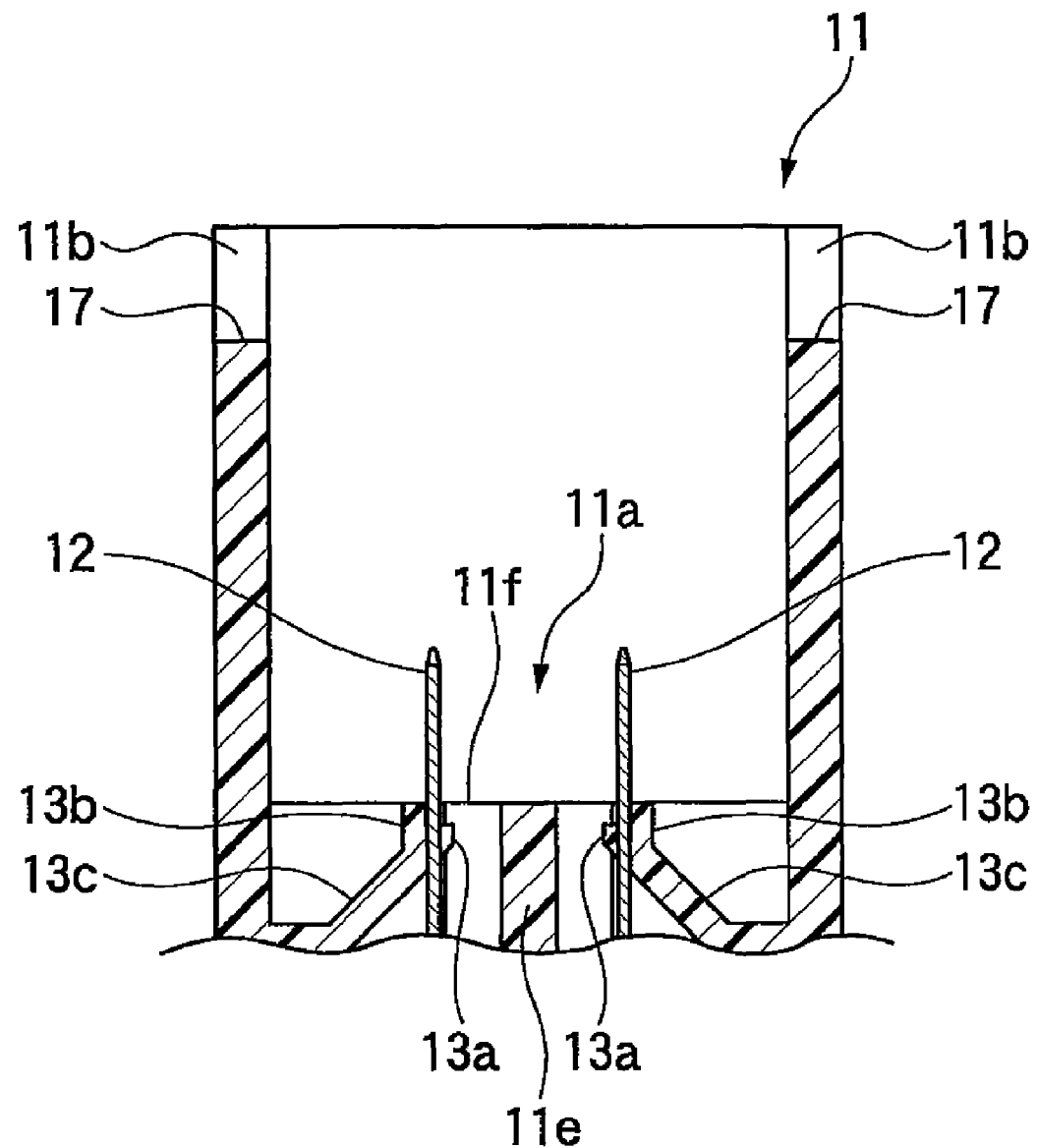
FIG. 9 is a cross-sectional view taken along the line IX-IX of FIG. 8.
Figure 10:
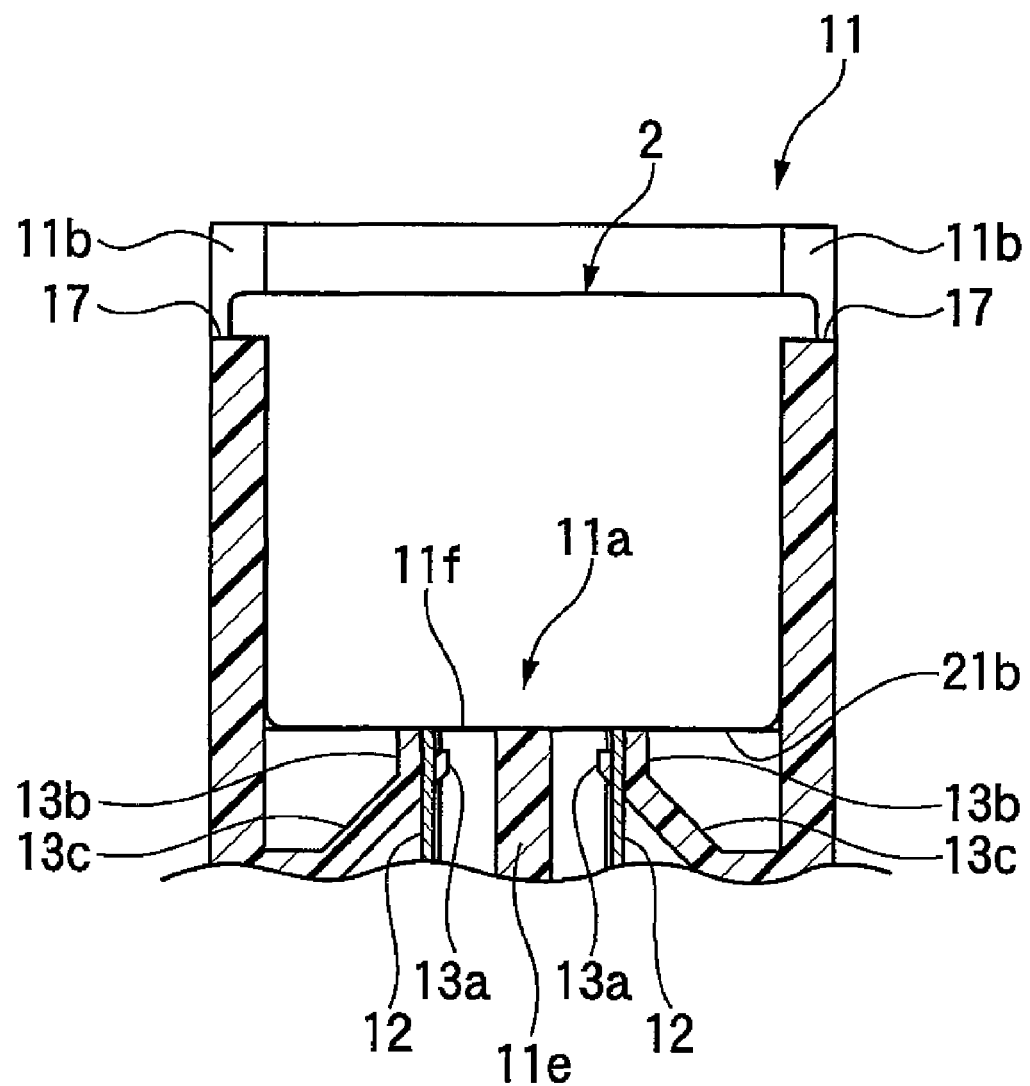
FIG. 10 is a cross-sectional view showing a condition in which a fuse is attached to the fuse cavity of FIG. 9.

The inner bottom portion 11a of the fuse cavity 11 shown in FIG. 8, FIG. 9 and FIG. 10 is formed by four corner portions 11c defined by inner peripheral faces 11b of the fuse cavity 11, two pedestals 11d disposed contiguous respectively to two faces which are opposed to each other in a direction perpendicular to a direction of juxtaposition of a pair of cavity terminals 12, and an elongated projection 11e having longitudinally-spaced opposite ends integrally molded respectively with the two pedestals 11d. The inner bottom portion 11a of the fuse cavity 11 is not provided with the above-mentioned projecting portion 16, and an upper face 11f of the inner bottom portion 11a of the fuse cavity 11 formed by the corner portions 11c, the pedestals 11d and the elongated projection 11e is formed on a common plane over an entire area thereof.

The upper face 11f of the inner bottom portion 11a of the fuse cavity 11 is formed on the common plane, and therefore when the fuse 2 is inserted into the fuse cavity 11 as shown in FIG. 10, the upper face 11f of the inner bottom portion 11a of the fuse cavity 11 abuts against the lower face 21b of the housing 21 of the fuse 2 over the entire area thereof. Therefore, the area of the lower surface 21b of the housing 21 of the fuse 2 abutting against the inner bottom portion 11a of the fuse cavity 11 is larger as compared with the area of the lower surface 21b of the housing 21 of the fuse 2 abutting against the inner bottom portion 11a of the fuse cavity 11 in FIG. 5, FIG. 6 and FIG. 7.

As described above, in the fuse cavity 11 of the electric connection box according to the one embodiment of the present invention, the upper face of the projecting portion 16 formed on the inner bottom face of the fuse cavity 11 and extending upwardly from this inner bottom face abuts against the lower face 21b of the housing 21 of the fuse 2, and the gap 15e is formed between the inner bottom face of the fuse cavity 11 and the lower face 21b of the housing 21 of the fuse 2 because of the projecting portion 16. Therefore, even when that portion of the housing of the fuse disposed forwardly in the direction of insertion into the fuse cavity is fusedly damaged by heat radiation of the fusible element or the deposition of the melted fusible element, the area of that portion of the fuse cavity adhering to the fusedly-damaged portion of the housing can be kept to a small level. Therefore, the fuse whose housing is fusedly-damaged can be easily taken out from the fuse cavity.

Furthermore, in the fuse cavity 11 of the electric connection box according to the one embodiment of the present invention, the elongated projection 16b of the projecting portion 16 is provided at the inner bottom portion 11a of the fuse cavity 11, and is located between the cavity terminals 12 when viewed from the upper side of the fuse cavity 11, and also is located right beneath the fusible element 23 of the fuse 2 inserted in the fuse cavity 11. By the cooperation of the upper face 16d of this elongated projection 16b and the inner peripheral faces 11b of the fuse cavity with each other, the well-balanced stable supporting of the housing 21 of the fuse 2 can be effected when the fuse 2 is accommodated within the electric connection box 1.

In the one embodiment of the electric connection box of the present invention, although description has been made of the construction in which the inner bottom portion 11a of the fuse cavity 11 has the projecting portion 16 formed on the inner bottom face thereof and extending upwardly from this inner bottom face, there may be provided a construction in which the inner bottom portion 11a of the fuse cavity 11 has recess portions formed at the inner bottom face thereof and recessed downwardly from this inner bottom face. When applying this construction to the inner bottom portion 11a of the fuse cavity 11 which has been described with reference to FIG. 5, FIG. 6 and FIG. 7, a cubic structure, having a bottom face defined by the upper face of the non-projecting portion 15 and a height defined by the height difference between the upper face of the non-projecting portion 15 and the upper face of the projecting portion 16, corresponds to the recess portions. Even in the construction in which the recess portions are provided at the inner bottom portion 11a of the fuse cavity 11, the area of that portion of the fuse cavity adhering to the fusedly-damaged portion of the housing can be kept to a small level in the same manner as in the construction in which the projecting portion 16 is provided at the inner bottom portion 11a of the fuse cavity 11.

In the above-mentioned one embodiment of the electric connection box of the present invention, although description has been made of the construction in which the pedestals 16a which are part of the projecting portion 16 are provided to be disposed contiguous to the inner peripheral faces 11b of the fuse cavity 11, and the elongated projection 16b which is part of the projecting portion 16 is provided to be located between the pair of cavity terminals 12, the position of the projecting portion 16 provided at the inner bottom portion 11a of the fuse cavity 11 is not limited to these positions, and can be provided at an arbitrary position of the inner bottom portion 11a of the fuse cavity 11. Preferably, it is suitably provided taking the positions of the pair of cavity terminals 12, the positions of the terminal support bodies 13 and the positions of the accommodating grooves 14 into consideration.

Figure 11:
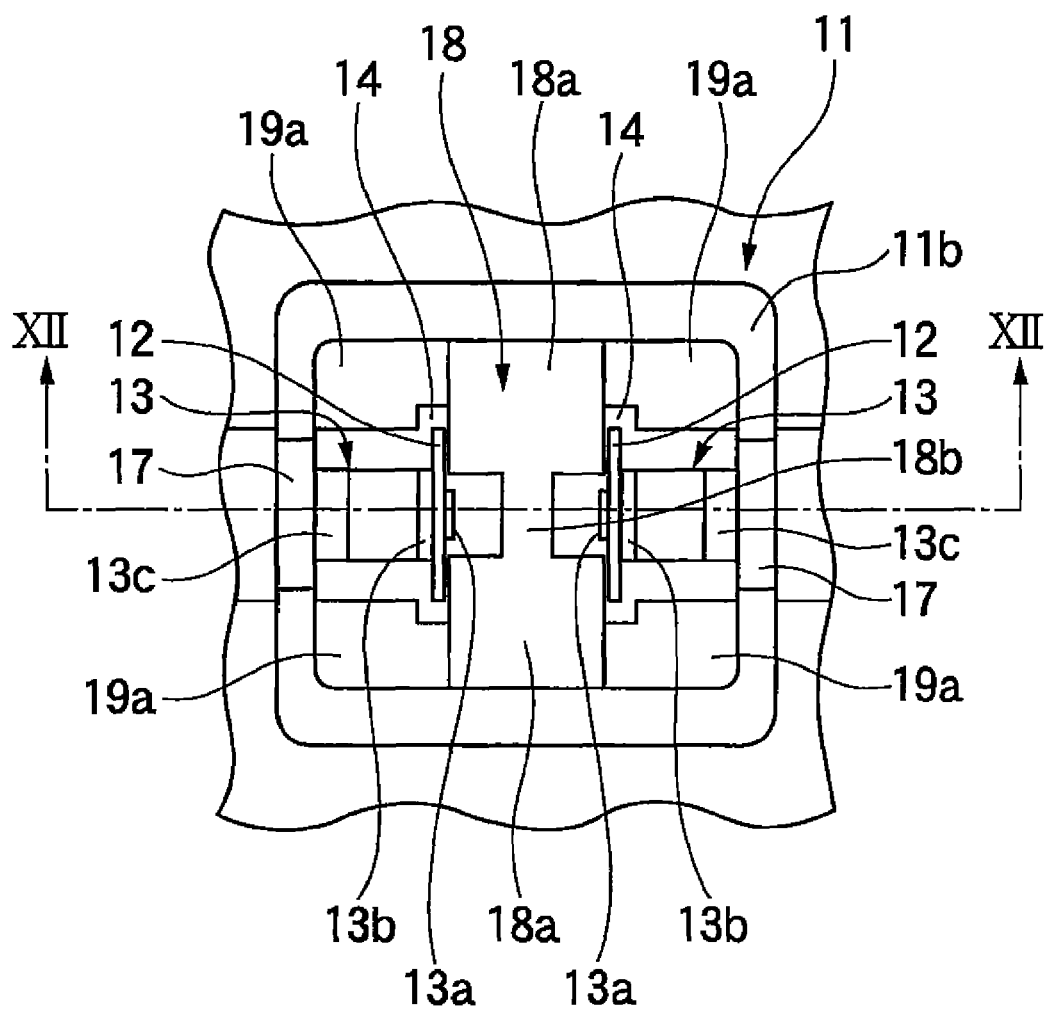
FIG. 11 is a view showing a fuse cavity of another embodiment of an electric connection box of the present invention as seen from an upper side.
Figure 12:
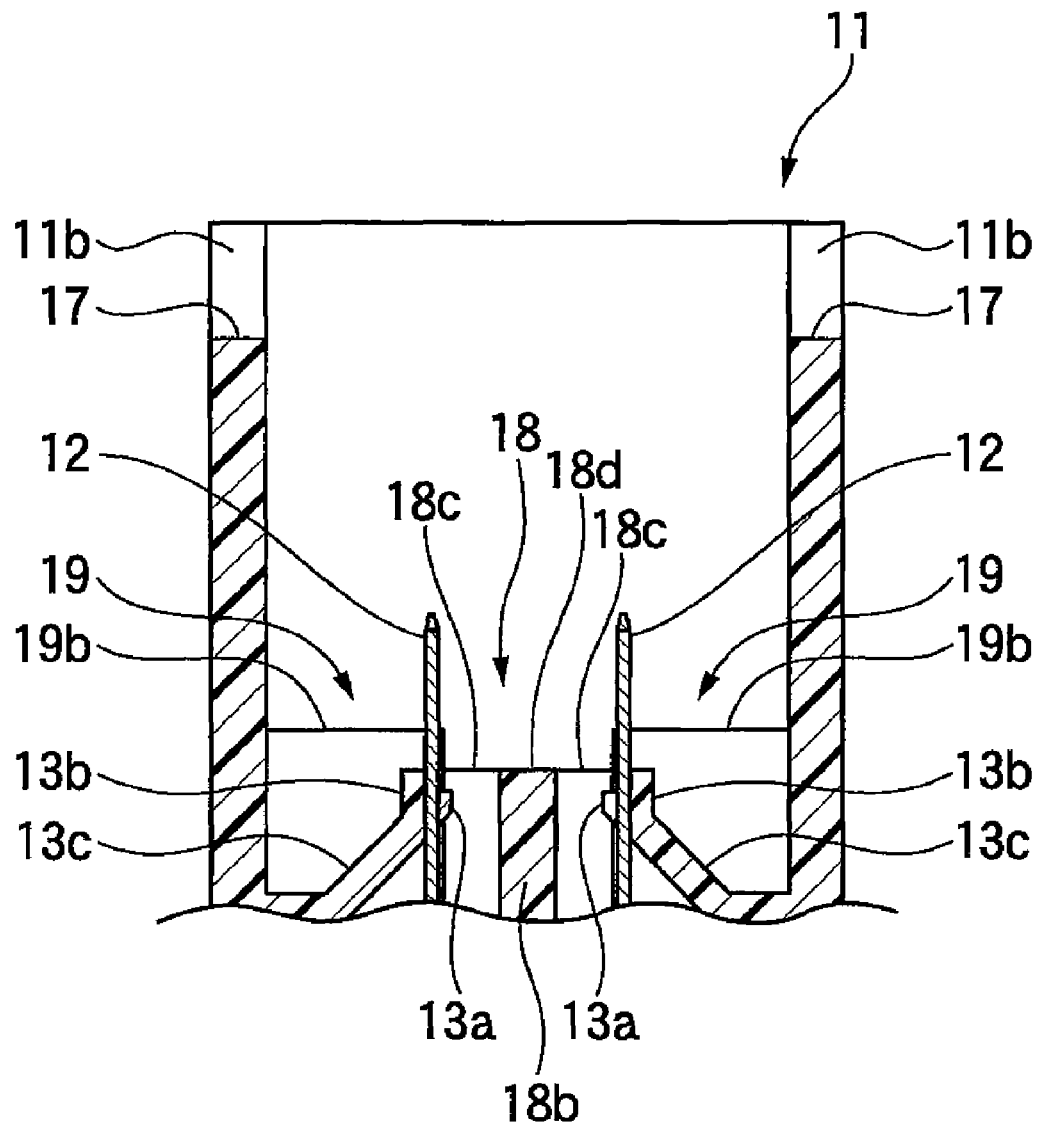
FIG. 12 is a cross-sectional view taken along the line XII-XII of FIG. 11.
Figure 13:
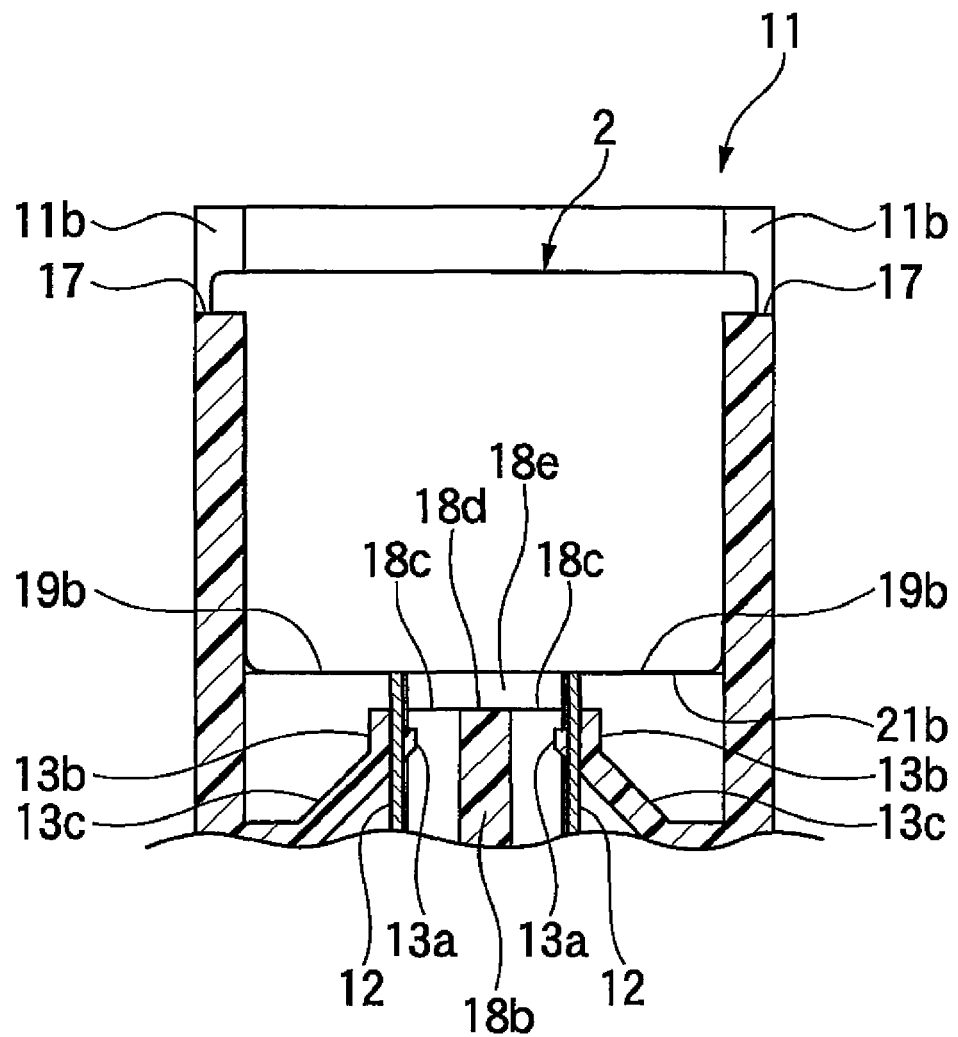
FIG. 13 is a cross-sectional view showing a condition in which a fuse is attached to the fuse cavity of FIG. 12.
Figure 14:
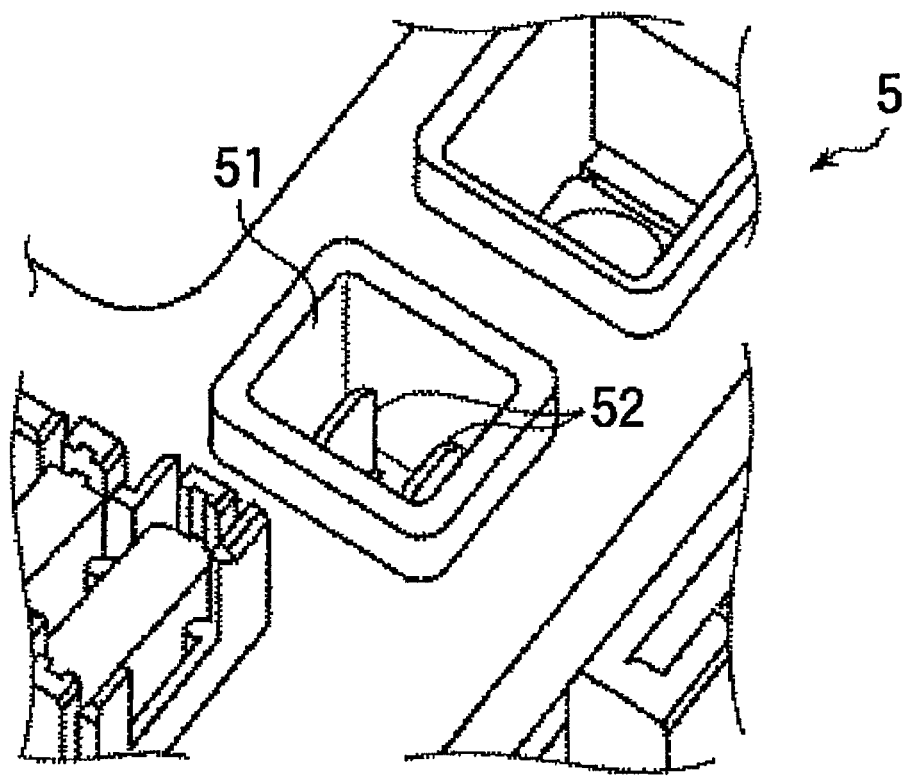
FIG. 14 is a perspective view showing an main portion of one form of conventional electric connector in a fuse non-attached condition.
Figure 15:
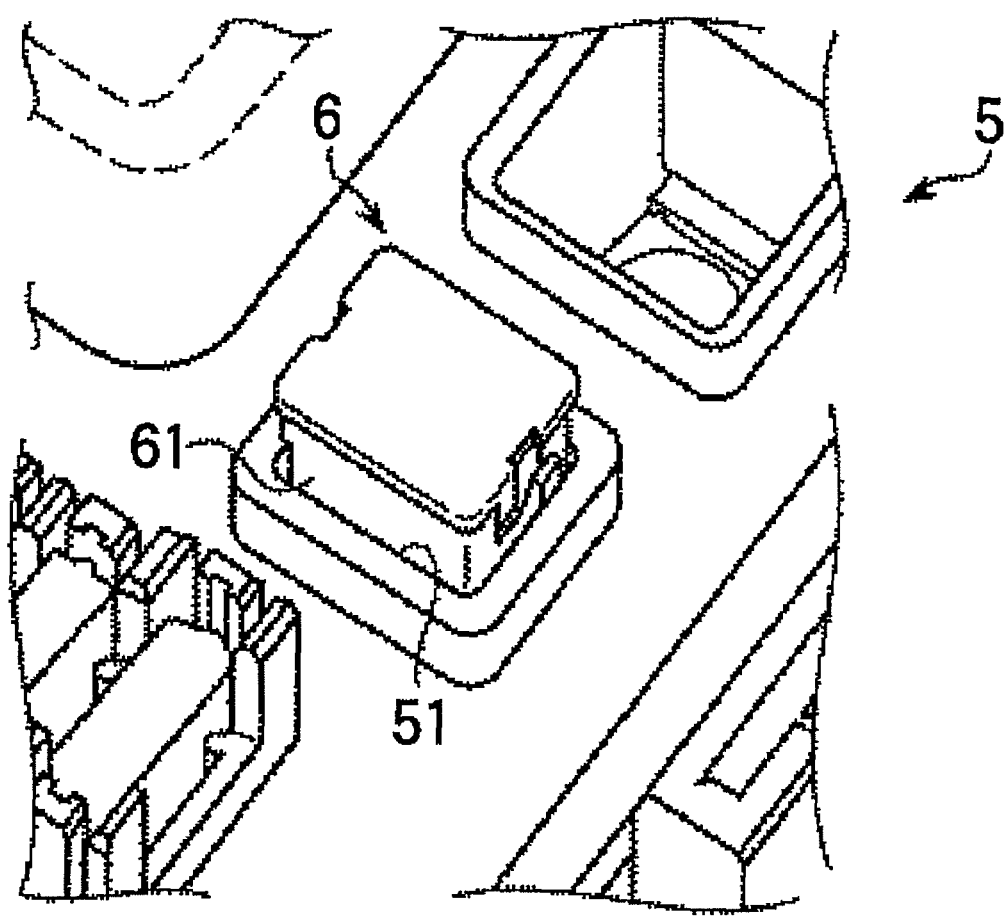
FIG. 15 is a perspective view showing a condition in which a fuse is attached to the electric connection box of FIG. 14.

The case where a projecting portion is provided at a position different from that in the above-mentioned one embodiment of the electric connection box of the present invention will be described with reference to FIG. 11 to FIG. 13. Here, each portion of a fuse cavity 11 forming an inner bottom portion 11a except a non-projecting portion and the projecting portion as well as each portion of the fuse 2 is as described with reference to FIG. 4 to FIG. 7, and therefore explanation thereof will be omitted.

The inner bottom portion 11a of the fuse cavity 11 is formed by the non-projecting portion 18 and the projecting portion 19. The non-projecting portion 18 forms part of the inner bottom portion 11a of the fuse cavity 11, and is formed by two pedestals 18a, disposed contiguous respectively to two of four inner peripheral faces 11b of the fuse cavity 11 which are opposed to each other in a direction perpendicular to a direction of juxtaposition of a pair of cavity terminals 12, and an elongated projection 18b having longitudinally-spaced opposite ends integrally molded respectively with the two pedestals 18a. The projecting portion 19 is formed by four corner portions 19a defined by the four inner peripheral faces 11b of the fuse cavity 11. Upper faces 19b of the four corner portions 19a are formed on a common plane, and the positions of the upper faces 19b are disposed above upper faces 18c of the two pedestals 18a and an upper face 18d of the elongated projection 18b. Therefore, when the fuse 2 is inserted into the fuse cavity 11 as shown in FIG. 13, the upper faces 19b of the four corner portions 19a abut against a lower face 21b of a housing 21 of the fuse 2, while the upper faces 18c of the two pedestals 18a and the upper face 18d of the elongated projection 18b do not abut against the lower face 21b of the housing 21 of the fuse 2, and a gap 18e is formed between them and the lower face 21b of the housing 21 of the fuse 2. Therefore, the area of the lower face 21b of the housing 21 of the fuse 2 abutting against the inner bottom portion 11a of the fuse cavity 11 is limited to the areas of the upper faces 19b of the four corner portions 19a.

As described above, in the fuse cavity 11 of the electric connection box according to the other embodiment of the present invention, the four corner portions 19 are formed in a projecting manner on the inner bottom portion 11a so that the gap 18e can be formed between the upper faces 18c of the pedestals 18a or the upper face 18d of the elongated projection 18b and the lower face 21b of the housing 21 of the fuse 2. When the housing 21 of the fuse 2 is fusedly damaged, the fusing damage starts from the portion near to a fusible element 23; however, when the fuse cavity 11 having the fuse 2 inserted therein is viewed from the upper side, the four corner portions 19a are located at the respective regions disposed far away from the fusible element 23, and therefore the upper faces of the projecting portion 19 abut respectively against those portions of the lower face 21b of the housing 21 which are harder to fusedly damage. Therefore, the fusedly-damaged housing can even be prevented from adhering to the upper faces of the projecting portion 19.

As described above, in the electric connection box of the present invention, even when that portion of the housing of the fuse disposed forwardly in the direction of insertion into the fuse cavity is fusedly damaged by heat radiation of the fusible element or the deposition of the melted fusible element, the area of that portion of the fuse cavity adhering to the fusedly-damaged portion of the housing can be kept to a small level. Therefore, the fuse whose housing is fusedly-damaged can be easily taken out from the fuse cavity. Therefore, in the present invention, a workload for fuse exchange can be reduced.

In the electric connection box of the present invention, when the slow blow fuse whose housing can be more fusedly damaged is inserted, the fusedly-damaged housing can be more markedly restrained from adhering to the inner bottom face of the fuse cavity.

The present Application is based on Japanese Patent Application No. 2008-013063 filed on Jan. 23, 2008, and the contents of which are incorporated herein for reference.

Industrial Applicability

In the electric connection box of the present invention, the area of the portion of the fuse cavity adhering to the fusedly-damaged portion of the housing can be kept to a small level, and therefore the fuse whose housing is fusedly damaged can be easily taken out from the fuse cavity, and therefore the workload for fuse exchange can be reduced.

Reference Signs list 1 electric connection box
11 fuse cavity
11a inner bottom portion of the fuse cavity
12 cavity terminal
13 terminal support body
14 accommodating groove
15 non-projecting portion
15a corner portion
15b central portion
15c upper face of the corner portion 15a
15d upper face of the central portion 15b
15e gap
16 projecting portion
16a pedestal
16b elongated projection
16c upper face of the pedestal 16a
16d upper face of the elongated projection 16b
17 engagement groove
2 fuse
21 housing
21a engagement portion
21b lower face of the housing 21
21c open portion
21d insertion passage
22 fuse terminal
23 fusible element

The invention claimed is:

1. An electric connection box comprising:
a fuse cavity, made of synthetic resin, into which a fuse can be inserted from an upper side, the fuse including a pair of fuse terminals, a fusible element electrically connecting the fuse terminals, and a housing made of synthetic resin and accommodating the fuse terminals so as to cover the fusible element; and
a pair of cavity terminals configured to come in contact with the fuse terminals to be electrically connected thereto when the fuse is inserted into the fuse cavity,
wherein a lower face of the housing of the fuse inserted in the fuse cavity is configured to abut against an inner bottom portion of the fuse cavity, so that the fuse is positioned in the fuse cavity in a downward direction;
wherein the inner bottom portion has a non-projecting portion and a projecting portion formed on an inner bottom face of the inner bottom portion, the projecting portion extending upwardly from the inner bottom face more than the non-projecting portion;
wherein an upper face of the projecting portion abuts against the lower face of the housing;
wherein an empty space is formed between an upper face of the non-projecting portion and the lower face of the fuse housing;
wherein the inner bottom portion is in a range of the height of a pair of opposing side walls of the fuse cavity;
wherein the non-projecting portion is formed in a plane; and
wherein a total area of the non-projecting portion is more than or equal to a total area of the upper face of the projecting portion.

2. An electric connection box as set forth in claim 1, wherein
the projecting portion is provided at the inner bottom face between the cavity terminals when the fuse cavity is viewed from the upper side, and
the projecting portion is located right beneath the fusible element of the fuse accommodated in the fuse cavity.

3. An electric connection box as set forth in claim 2, wherein the fuse is a slow blow fuse.

4. An electric connection box as set forth in claim 1, wherein
the projecting portion is projected on the inner bottom face so that the empty space is formed between the lower face of a portion of the housing of the fuse located right beneath the fusible element and the inner bottom face of the fuse cavity, in a state where the fuse is accommodated in the fuse cavity.

5. An electric connection box as set forth in claim 4, wherein the fuse is a slow blow fuse.

6. An electric connection box as set forth in claim 1, wherein the fuse is a slow blow fuse.

7. An electric connection box as set forth in claim 1, wherein the projecting portion comprises a pair of pedestal members disposed respectively at the opposing side walls of the cavity, and an elongated member disposed between and interconnecting the pedestal members.

8. An electric connection box as set forth in claim 7, wherein a top surface of the pedestal members and a top surface of the elongated member extend along a same plane.

9. An electric connection box as set forth in claim 8, wherein the fuse cavity comprises a plurality of bottom corners and the inner bottom face is formed at the bottom corners of the fuse cavity along a bottom plane which is below the same plane of the top surfaces.

10. An electric connection box as set forth in claim 1, wherein the total area of the upper face of the projection portion which abuts against the lower face of the housing is less than the total area of the non-projecting portion.

* * * * *